(12) United States Patent
Kim et al.

(10) Patent No.: US 10,220,524 B1
(45) Date of Patent: Mar. 5, 2019

(54) ROBOT ARM FOR DIE CASTING

(71) Applicants: HYUNDAI MOTOR COMPANY, Seoul (KR); KIA MOTORS CORPORATION, Seoul (KR)

(72) Inventors: Young Gi Kim, Seoul (KR); Myoung Ho Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/824,710

(22) Filed: Nov. 28, 2017

(30) Foreign Application Priority Data

Aug. 17, 2017 (KR) .................. 10-2017-0104016

(51) Int. Cl.
   *B25J 19/00* (2006.01)
   *B25J 15/00* (2006.01)

(52) U.S. Cl.
   CPC ............ *B25J 19/0054* (2013.01); *B25J 15/00* (2013.01)

(58) Field of Classification Search
   CPC ............... B25J 11/0085; B25J 15/0023; B25J 15/0076; B25J 19/0054; B25J 19/0058; B25J 15/00
   USPC ................................ 294/213, 216, 86.4, 185
   See application file for complete search history.

(56) References Cited

U.S. PATENT DOCUMENTS

| | | | | |
|---|---|---|---|---|
| 4,768,356 A | * | 9/1988 | Volker | ............... B23Q 11/1053 62/50.5 |
| 5,452,932 A | * | 9/1995 | Griffin | ..................... B25J 15/00 294/216 |
| 6,499,777 B1 | * | 12/2002 | Wang | .................... C30B 35/005 118/728 |
| 7,802,830 B2 | * | 9/2010 | Brueckner | ........ H01L 21/67742 294/185 |
| 8,827,339 B2 | * | 9/2014 | Takemura | .............. B25J 9/0012 294/213 |
| 2007/0209593 A1 | * | 9/2007 | Aggarwal | ............... C23C 16/54 118/724 |
| 2011/0182699 A1 | * | 7/2011 | Kurita | .................. B25J 19/0054 414/172 |

FOREIGN PATENT DOCUMENTS

KR    10-2008-0011902 A    2/2008
KR    10-1431310 B1    8/2014

* cited by examiner

*Primary Examiner* — Dean J Kramer
(74) *Attorney, Agent, or Firm* — Morgan Lewis & Bockius LLP

(57) ABSTRACT

A robot arm for die casting according to an embodiment of the present invention, which clamps and moves a cast-iron product, includes: an arm unit having a plurality of joints; a hand unit coupled to an end of the arm unit to clamping the cast-iron product; and a cooling unit having a plurality of nozzles disposed at the hand unit and separately operating to spray cooling water to a surface of the cast-iron product.

8 Claims, 4 Drawing Sheets

300(310,320,330)

ROBOT ARM FOR DIE CASTING

CROSS REFERENCE TO RELATED APPLICATION

The present application claims priority to Korean Patent Application 10-2017-0104016, filed Aug. 17, 2017, the entire contents of which is incorporated herein for all purposes by this reference.

BACKGROUND

Field of the Invention

The present invention relates to a robot arm for taking out and moving a cast-iron product and, more particularly, to a robot arm for die casting, the robot arm being able to prevent deformation and improve strength of a cast-iron product, which has been partially cooled, in the process of taking out and moving the die casting product from a mold.

Description of the Related Art

In general, die casting, which is also called pressure die casting, is one type of investment casting that obtains a casting that is the same as a steel mold, which is accurately machined to be completely the same as the shape of a required casting, by injecting molten metal into the mold, and a part that is manufactured by die casting is called cast-iron product.

Cast-iron products have accurate dimensions and high mechanical properties and can be produced in large quantities, so they are generally used as automotive parts, and zinc, aluminum, tin, copper, and magnesium alloys are generally used as the metal for die casting.

In particular, recently, cast-iron products made of aluminum alloys are increasingly used with the trend of manufacturing light weight vehicles.

Automotive parts manufactured with a thickness of 5 mm or less by die casting aluminum alloys can be quickly cooled in a mold, so they have high strength even without additional heat treatment.

However, when parts having a thickness of 10 mm or more, particularly, around 20 mm are manufactured, they are extracted from a mold without being sufficiently cooled, so the strength is relatively decreased, as compared with parts having a thickness of 5 mm or less.

Accordingly, a method of rapidly cooling a cast-iron product in a water tank and then performing aging heat treatment after die casting to improve the strength of thick portions of the cast-iron product has been developed.

However, according to this method, the entire cast-iron product is cooled, so it causes defects such as torsion of the cast-iron product during the cooling.

FIG. 1 is a picture showing a crack in a cast-iron product manufactured by inserting an insert made of cast iron. As shown in FIG. 1, when a product is die-casted by inserting an insert made of a different material such as cast iron, residual stress is generated or the insert is damaged due to the difference in thermal expansion between an aluminum alloy and the cast iron.

SUMMARY

The present disclosure has been made in an effort to solve the above problems and an object of the present disclosure is to provide a robot arm for die casting, the robot arm being able to improve the strength of a cast-iron product that is made of an aluminum alloy with a thick portion over 10 mm and is partially cooled in the manufacturing process.

In particular, the present disclosure provides a robot arm for die casting, the robot arm being able to prevent defects such as cracks when a cast-iron product with an insert made of a different material therein is manufactured.

The technical subjects to implement in the present disclosure are not limited to the technical problems described above and other technical subjects that are not stated herein will be clearly understood by those skilled in the art from the following specifications.

A robot arm for die casting according to an embodiment of the present disclosure, which clamps and moves a cast-iron product, includes: an arm unit having a plurality of joints; a hand unit coupled to an end of the arm unit for clamping the cast-iron product; and a cooling unit having a plurality of nozzles disposed at the hand unit and separately operating to spray cooling water to a surface of the cast-iron product.

The cooling unit may further have a main channel disposed in the hand unit and allowing cooling water to flow therethrough to adjust temperature of the hand unit; and diverging channels diverging from the main channel and connected to the nozzles.

The main channel may be formed in a zigzag shape in a width direction in the hand unit.

The main channel may be made of a flexible material to be variable in correspondence to operation of the hand unit.

The robot arm may further include a cooling water tank connected to the main channel to supply cooling water.

The cast-iron product may have a thick portion having a thickness of 10 mm or more.

The cooling unit may open and close the nozzles to spray cooling water to the thick portion.

The nozzles may be rotatably coupled to the hand unit to spray cooling water to the thick portion.

The degrees of opening and closing of the nozzles may be varied so that the amount of cooling water is adjusted.

According to an embodiment of the present disclosure, since only a thick portion having a thickness of 10 mm or more is rapidly cooled, defects are prevented and strength is improved, whereby it is possible to improve the quality of a product.

Further, since it is possible to remove a specific cooling process, it is possible to reduce the manufacturing time and improve productivity.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
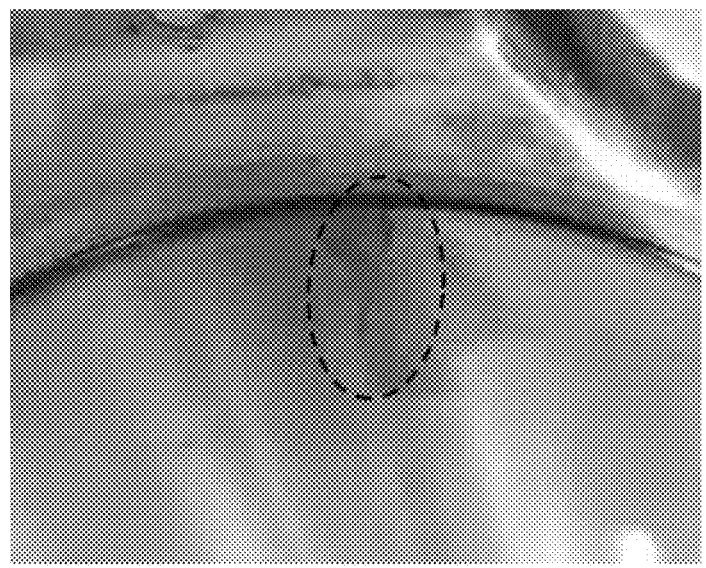
FIG. 1 is a picture showing a crack in a cast-iron product manufactured by inserting an insert made of cast iron.

Although exemplary embodiments of the present disclosure will be described hereafter in detail with reference to the accompanying drawings, the present disclosure is not limited to the embodiments. For reference, in the following description, like reference numerals substantially indicate like components, so it is possible to refer to components shown in other figures and description determined as being apparent to those skilled in the art or repeated may not be provided.

Figure 2:
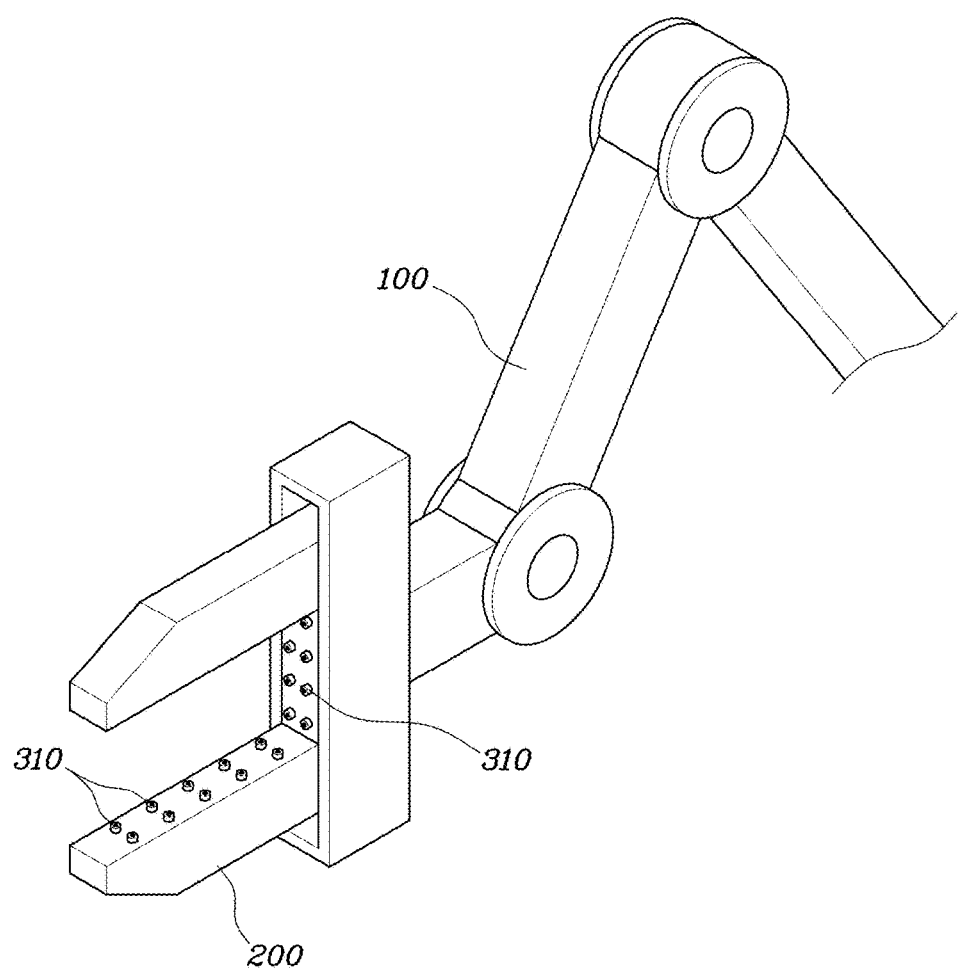
FIG. 2 is a perspective view showing a robot arm for die casting according to an embodiment of the present disclosure.
Figure 3A:
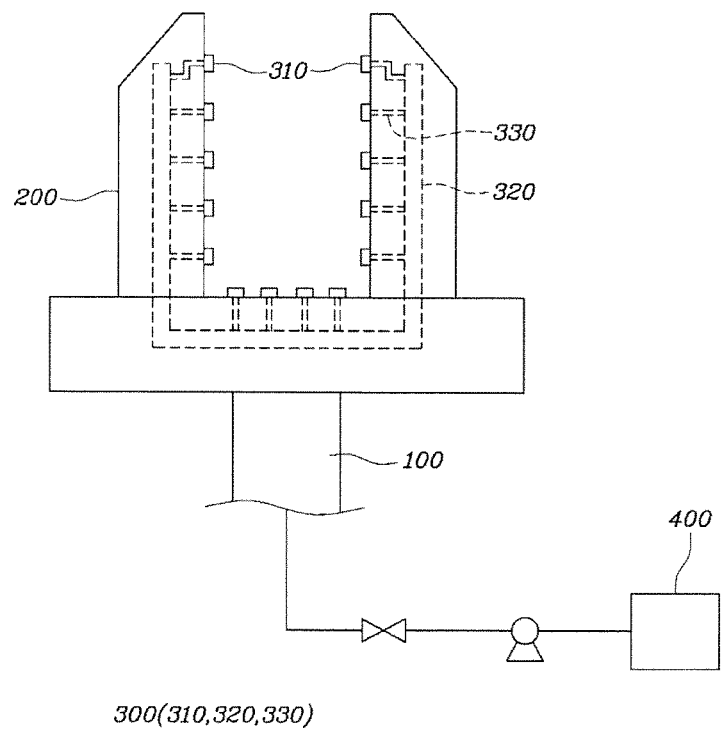
FIG. 3A is a view showing a hand unit according to an embodiment of the present disclosure.
Figure 3B:
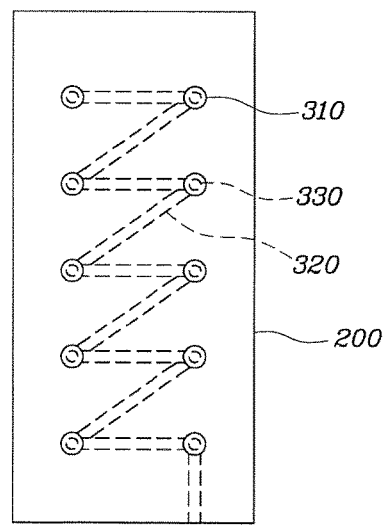
FIG. 3B is a plan view of the nozzles in FIG. 3A.

FIG. 2 is a perspective view showing a robot arm for die casting according to an embodiment of the present disclosure and FIG. 3A is a view showing a hand unit according to an embodiment of the present disclosure, and FIG. 3B is a plan view of the nozzles in FIG. 3A.

As shown in FIGS. 2, 3A, and 3B, a robot arm for die casting according to an embodiment of the present disclosure includes an arm unit 100 having a plurality of joints, a hand unit 200 coupled to an end of the arm unit 100 to clamp a cast-iron product, and a cooling unit 300 disposed at the hand unit 200 to spray cooling water.

It is preferable for the arm unit 100 to have a plurality of joints to be able to move a cast-iron product clamped by the hand unit 200 to a desired place.

The hand unit 200 is coupled to an end of the arm unit 100 and has a plurality of fingers that comes in contact with a cast-iron product and the width between the fingers is variable to be able to clamp a cast-iron product.

The cooling unit 300 according to an embodiment of the present disclosure is disposed at the hand unit 200 to be able to cool a cast-iron product clamped by the hand unit 200 by spraying cooling water to the surface of the cast-iron product.

In detail, the cooling unit 300 has a plurality of nozzles 310 for spraying cooling water to the surface of a cast-iron product, a main channel 320 through which cooling water flows, and a plurality of divergent channels 330 diverging from the main channel 320 and connected to the nozzles 310.

The robot arm for die casting according to an embodiment of the present disclosure may further include a cooling water tank 400 for keeping the cooling water to be sprayed from the nozzles 310 and the main channel 320 is connected to the cooling water tank 400, so cooling water is supplied from the cooling water tank 400, for example, by a pump.

The main channel 320 according to an embodiment of the present disclosure may be disposed in a zigzag shape in the hand unit.

This is because the contact area between the hand unit 200 and the main channel 320 is increased, whereby it is possible to prevent malfunction and deformation of the hand unit 200 by reducing an increased temperature of the hand unit 200 when a high-temperature cast-iron product is clamped thereby by making heat transfer smooth between the main channel 320 and the hand unit 200.

Further, the main channel 320 in the present disclosure may be made of a flexible material such as rubber, because it is possible to prevent damage such as cracks or cutting when the fingers clamp a cast-iron product by changing the width therebetween.

Further, the main channel 320 in the present disclosure may be made of a flexible material such as rubber, because it is possible to prevent damage such as cracks or cutting when the fingers clamps cast-iron product by changing the width therebetween.

Further, the main channel 320 may be formed in a bellows pipe shape having a variable length at the points where it diverges to the fingers, in order to correspond to the operations of the fingers.

The present disclosure can be characterized in that it is possible to partially cool a cast-iron product having thick portions over 10 mm in thickness by spraying cooling water only to thick portions not sufficiently cooled in a mold in the process of clamping and moving the cast-iron product.

The divergent channels 330 diverging from the main channel 320 having this configuration to the nozzles 310 each has a shutoff valve therein, so it is possible to cool only thick portions by separately controlling the nozzles 310 by opening only the nozzles 310 for spraying cooling water to portions to be cooled, that is, thick portions of the cast-iron product extracted out of a mold and the shutoff valves in the divergent channels 330.

All of the nozzles 310 may be connected to be simultaneously opened and closed, depending on manufacturing conditions such as the shape of a cast-iron product.

The nozzles 310 according to an embodiment of the present disclosure may be rotatably coupled to rotary units through ball joints to be able to spray cooling water to thick portions in correspondence to various shapes of cast-iron products.

Accordingly, it is possible to improve the efficiency of cooling thick portions of a cast-iron product by concentrating cooling water from the nozzles 310 to the thick portions, and when cooling water sprayed from the nozzles 310 cannot reach a thick portion, it is possible to smoothly cool the thick portions by adjusting the spray direction of the nozzles 310 and then spraying cooling water to the thick portion.

Further, the degrees of opening/closing of the cooling nozzles 310 according to an embodiment of the present disclosure may be varied so that the amount of cooling water that is sprayed from the nozzles 310 are independently adjusted.

This is because it is possible to improve the cooling efficiency for a thick portion by increasing the amount of cooling water that is sprayed from nozzles 310 to the thick portion in comparison to nozzles 310 spraying cooling water to other portions.

Therefore, it is possible to improve the strength of a cast-iron product that is manufactured, by rapidly increasing thick portions of the cast-iron product of an aluminum alloy so that a reinforcing phase is deposited in the thick portions.

Figure 4:
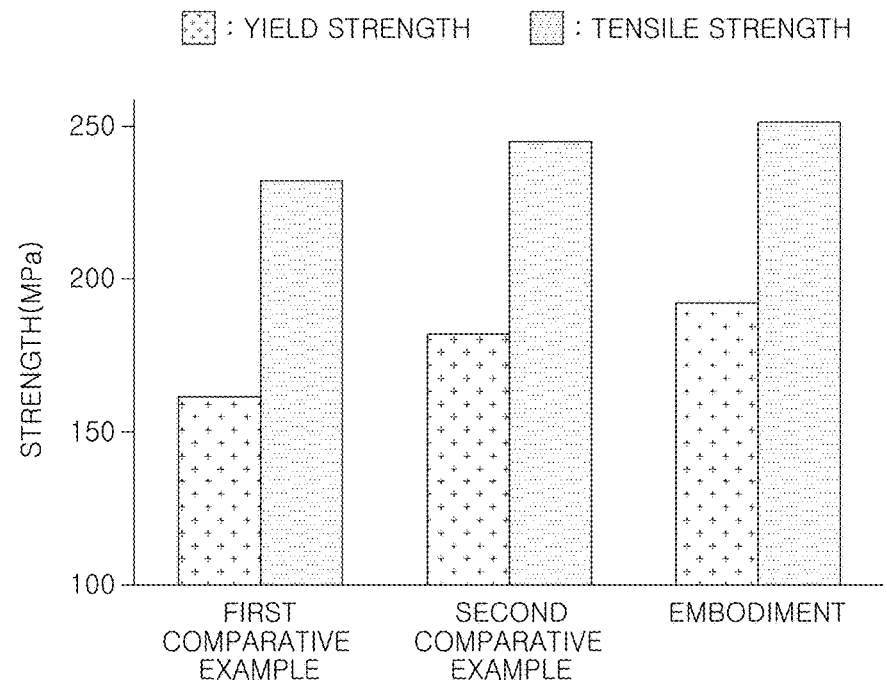
FIG. 4 is a table showing strengths measured from comparative examples and an embodiment manufactured using a robot arm for die casting according to an embodiment of the present disclosure.

FIG. 4 is a table showing strengths measured from comparative examples and an embodiment manufactured using a robot arm for die casting according to an embodiment of the present disclosure.

As shown in FIG. 4, it can be seen that the tensile strength and yield strength of the cast-iron product that has undergone rapid cooling in a water tank in the second comparative example were larger than those of the cast-iron product that has not been undergone rapid cooling in the first comparative example.

In particular, it can be seen that the tensile strength and yield strength of the cast-iron product manufactured with thick portions cooled by the robot arm for die casting according to an embodiment of the present disclosure were increased by about 5% in comparison to the second comparative example and about 19% in comparison to the first comparative example.

This is because the cooling speed was reduced by 10~30 seconds in comparison to the second comparative example that was cooled in cooling water in a water tank, so copper (Cu) and magnesium (Mg) that are reinforcing phases of an aluminum alloy in the thick portions were much solidified, so reinforcing phases such as $Al_2Cu$ and $Mg_2Si$ were maximally produced, thereby improving the strength of the thick portions.

Further, it is possible to reduce the amount of cooling water to be consumed to cool a cast-iron product having thick portions to the half level, it is possible to decrease the investment costs for the facilities because there is no need for a cooling facility such as a water tank for cooling, and it is also possible to improve productivity because the manufacturing time is reduced.

Although exemplary embodiments of the present disclosure were described above, it should understood that the present disclosure may be changed and modified in various ways by those skilled in the art without departing from the scope and split of the present disclosure described in the following claims.

What is claimed is:

1. A robot arm for clamping and moving a cast-iron product, the robot arm comprising:
    an arm unit having a plurality of joints;
    a hand unit coupled to an end of the arm unit for clamping the cast-iron product; and
    a cooling unit having a plurality of nozzles disposed at the hand unit and separately operating to spray cooling water to a surface of the cast-iron product,
    wherein the cooling unit opens and closes the nozzles to spray the cooling water to a thick portion of the cast-iron product.

2. The robot arm of claim 1, wherein the cooling unit further has:
    a main channel disposed in the hand unit and allowing the cooling water to flow therethrough to adjust temperature of the hand unit; and
    diverging channels diverging from the main channel and connected to the nozzles.

3. The robot arm of claim 2, wherein the main channel is formed in a zigzag shape in a width direction in the hand unit.

4. The robot arm of claim 3, wherein the main channel is made of a flexible material to be variable in correspondence to operation of the hand unit.

5. The robot arm of claim 2, further comprising a cooling water tank connected to the main channel to supply the cooling water.

6. The robot arm of claim 1, wherein the thick portion has a thickness of 10 mm or more.

7. The robot arm of claim 1, wherein the nozzles are rotatably coupled to the hand unit to spray the cooling water to the thick portion.

8. The robot arm of claim 1, wherein degrees of opening and closing of the nozzles are varied so that amount of the cooling water is adjusted.

* * * * *